(12) United States Patent
McKenney et al.

(10) Patent No.: US 8,230,446 B2
(45) Date of Patent: Jul. 24, 2012

(54) PROVIDING A COMPUTING SYSTEM WITH REAL-TIME CAPABILITIES

(75) Inventors: Paul E. McKenney, Beaverton, OR (US); Claudia Salzberg, Cambridge, MA (US); Rene Vandenbroeck, Wake Forest, NC (US); John K. Whetzel, Holly Springs, NC (US); Peter H. Reynolds, Raleigh, NC (US); Albert A. Asselin, Morrisville, NC (US); Keith Mannthey, Portland, OR (US); Torez Smith, Austin, TX (US); Jeffrey Franke, Apex, NC (US); Theodore Y. Tso, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 11/946,511

(22) Filed: Nov. 28, 2007

(65) Prior Publication Data

US 2009/0138896 A1    May 28, 2009

(51) Int. Cl.
*G06F 3/00* (2006.01)
*G06F 9/00* (2006.01)
*G06F 13/00* (2006.01)
*G06F 9/44* (2006.01)
*G06F 9/46* (2006.01)
*G06F 11/00* (2006.01)

(52) U.S. Cl. ........... 719/318; 719/319; 719/320; 714/48
(58) Field of Classification Search .................. None
See application file for complete search history.

(56) References Cited

U.S. PATENT DOCUMENTS

| | | | |
|---|---|---|---|
| 5,684,997 A * | 11/1997 | Kau et al. | 710/260 |
| 6,553,513 B1 * | 4/2003 | Swoboda et al. | 714/28 |
| 2004/0153708 A1 * | 8/2004 | Joshi et al. | 714/4 |
| 2004/0205755 A1 * | 10/2004 | Lescouet et al. | 718/100 |
| 2004/0243893 A1 * | 12/2004 | Mudge et al. | 714/724 |
| 2005/0010838 A1 * | 1/2005 | Davies et al. | 714/100 |

* cited by examiner

*Primary Examiner* — S. Sough
*Assistant Examiner* — Craig Dorais
(74) *Attorney, Agent, or Firm* — Steven Bennett (57) ABSTRACT

A computing system is provided with real-time capabilities so that the system is capable of running applications such that one or more real-time criteria are satisfied. An interrupt architecture of the computing system is disabled. The interrupt architecture generates interrupts sent to a firmware of the computing system in response to events. A different architecture is substituted within the computing system for the interrupt architecture. The different architecture is responsive to the events without violating the real-time criteria. In response to the events occurring, the different architecture causes one or more corrective actions to be performed.

20 Claims, 3 Drawing Sheets

PROVIDING A COMPUTING SYSTEM WITH REAL-TIME CAPABILITIES

FIELD OF THE INVENTION

The present invention relates generally to computing systems, and more particularly to providing such computing systems with real-time capabilities so that the computing system can run applications such that one or more real-time criteria are satisfied.

BACKGROUND OF THE INVENTION

In financial markets, defense, online gaming, and other types of applications, computing systems may be required to have real-time capabilities. A computing system with real-time capabilities means that the computing system can run applications such that one or more real-time criteria are satisfied. In particular, such real-time criteria usually specify the maximum length of time in which an application is permitted to respond to a given request made of the application. In so-called extreme or premium real-time environments, this length of time may be specified as 100 microseconds or less.

Many types of computing systems have interrupt architectures in which non-maskable interrupts that are generated, such as interrupts that are known as system management interrupts (SMI's), are transmitted to the firmware of the computing systems for appropriate handling. These types of interrupts can denote thermal events, which indicate that a computing system is running at a greater than specified operating temperature. These types of interrupts can further denote power consumption events, indicating that the computing system is consuming more than a specified amount of power, as well as error events, such as single-bit memory errors.

These types of interrupts are typically not preemptible. That means that if such an interrupt is generated, the processor of the computing system in question automatically halts whatever it is currently doing so that the firmware is able to respond to the interrupt. An interrupt architecture in which interrupts are handled in this manner typically does not present any issues for many types of applications and for many types of computing systems. However, this kind of interrupt architecture can be problematic for real-time computing systems in which applications have to be guaranteed that they can respond to received requests in accordance with one or more real-time criteria.

For example, a given real-time application running on a computing system may normally be able to respond to requests in less than the maximum length of time specified by the real-time criteria. However, if during the processing of such a request a processor of the computing system is interrupted so that the firmware can respond to a generated interrupt, the application may not be able to respond to the request in less than the maximum length of time specified by the real-time criteria. This is because the time it takes for the firmware to process the interrupt delays the application from completing its response to the request.

Simply disabling the interrupt architecture of a computing system, however, is not a viable option. The interrupt architecture of a computing system performs needed functionality. That is, thermal events, power consumption events, and error events are types of events that ultimately have to be processed in order for the computing system in question to perform—and to be monitored—properly. Thus, disabling the interrupt architecture, without taking other action, may ensure that applications can run in real-time in accordance with one or more real-time criteria, but may cause other problematic consequences. These consequences can include the computing system running at an operating temperature greater than specified, consuming more power than specified, running at reduced performance due to having to correct single-bit memory errors, and/or data corruption due to multiple-bit memory errors.

SUMMARY OF THE INVENTION

The present invention provides a computing system with real-time capabilities so that the computing system can run applications such that one or more real-time criteria are satisfied. A method of one embodiment of the invention disables an interrupt architecture of the computing system. The interrupt architecture generates interrupts sent to a firmware of the computing system in response to events. The method substitutes a different architecture within the computing system for the interrupt architecture of the computing system. The different architecture is responsive to the events without violating the real-time criteria. As such, in response to the events occurring, the different architecture causes one or more corrective actions to be performed.

Still other aspects and embodiments of the invention, as well as advantages provided by embodiments of the invention, will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and General Method

Figure 1:
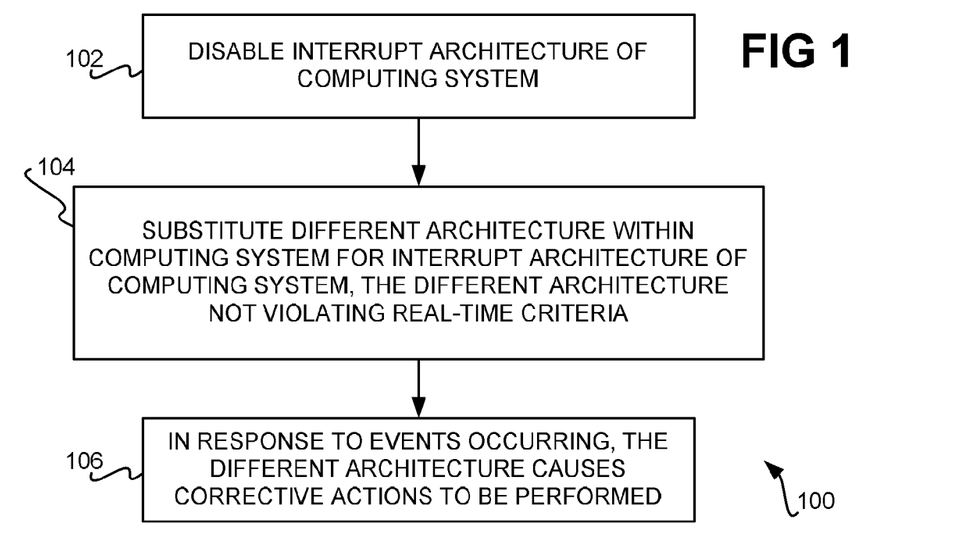
FIG. 1 is a flowchart of a method, according to an embodiment of the invention.

FIG. 1 shows a method 100, according to an embodiment of the invention. The method 100 may be implemented as one or more computer programs stored on a computer-readable medium of an article of manufacture. The computer-readable medium may be a recordable data storage medium, or another type of tangible computer-readable media. The computer-readable medium may further be a modulated carrier signal, or another type of intangible computer-readable media.

The method 100 generally provides a computing system with real-time capabilities, so that the computing system is capable of running applications such that one or more real-time criteria are satisfied. The applications may be financial markets, defense, online gaming, or other types of application computer programs. The real-time criteria may specify that the applications executed on the computing system are guaranteed to be able to respond to requests made of them in no more than a predetermined amount of time, such as 100 microseconds or less in one embodiment.

The method 100 disables an interrupt architecture of the computing system (102). The interrupt architecture generates interrupts that are sent to a firmware of the computing system in response to specific types of events occurring. The firmware may be a basic input/output system (BIOS), or another type of firmware. The BIOS, for instance, may be considered a set of routines stored in a non-volatile semiconductor memory of the computing system that provides an interface between the operating system of the computing system and the hardware of the computing system. However, interrupts that are normally handled by the operating system, such as input/output (I/O) device and timer interrupts, are not disabled. That is, these operating system-handled interrupts are not interrupts that are generated within the interrupt architecture that is disabled in part 102 of the method 100. Rather, the interrupt architecture that is disabled in part 102 may just be responsible for generating interrupts that are handled by the firmware of the computing system, and not interrupts that are handled by the operating system.

The interrupts that when generated are sent to the firmware may be non-maskable interrupts, in that they cannot be masked, such that they are always sent to the firmware when the interrupt architecture of the computing system is enabled. As such, disabling the interrupt architecture disables these non-maskable interrupts from being sent to the firmware in response to specific types of events occurring. In one embodiment, these non-maskable interrupts are particularly system management interrupts (SMI's). An SMI is a hardware interrupt in some types of processors that are used for power management and other purposes, as can be appreciated by those of ordinary skill within the art.

The events that the occurrence of which results in interrupts being generated within the interrupt architecture can include thermal events, power consumption events, and error events. A thermal event may specify that one or more different operating temperatures of the computing system have exceeded preset specified temperature thresholds. A power consumption event may specify that the computing system is consuming more power than a preset specified power consumption threshold. An error event may specify that a single-bit memory error has occurred—that is, a memory error has occurred in relation to a single bit of the memory of the computing system—or that another type of memory error or another type of error has occurred.

The method 100 substitutes a different, or additional, architecture within the computing system for the interrupt architecture of the computing system that has been disabled (104). The different architecture is also responsive to the types of events that the interrupt architecture is responsive to, such as thermal events, power consumption events, and error events. However, the different architecture is responsive to these types of events without violating the real-time criteria, in contradistinction to the interrupt architecture of the computing system, which can violate the real-time criteria in responding to events, as has been described in the background section.

Specific details of an exemplary different architecture of the computing system that can be substituted in part 104 of the method 100 are presented later in the detailed description. In response to a thermal event, a power consumption event, an error event, or another type of event occurring, the different architecture of the computing system causes one or more corrective actions to be performed (106). These corrective actions are intended to mollify the causes that resulted in the events being generated. Specific details of exemplary such corrective actions that can be performed in part 106 of the method 100 are presented later in the detailed description.

As a general example, however, in response to a thermal event, the different architecture may cause the computing system to run cooler, so that the operating temperature of the computing system is below the prespecified temperature threshold. Similarly, in response to a power consumption event, the different architecture may cause the computing system to consume less power, so that the power consumption is below the prespecified power consumption threshold. In response to an error event, the different architecture may attempt to rectify the error that resulted in the event, or configure the computing system so that the error does not affect operation of the computing system.

As such, the different architecture of the computing system is able to respond to events, such as thermal, power consumption, and error events—as well as other types of events that are not handled by the operating system (i.e., that are sent to a firmware of the computing system for handling)—without violating the real-time criteria, and so that the computing system maintains its real-time capabilities in this respect. By comparison, the interrupt architecture of such a computing system is not guaranteed to be able to respond to such events without violating the real-time criteria, and without the computing system maintaining its real-time capabilities in this respect. Therefore, the different architecture of the computing system is responsive to the same types of events that the interrupt architecture is, but in a way that ensures that the real-time criteria are satisfied.

Technical Background, Computing System, and Computing Device

Figure 2:
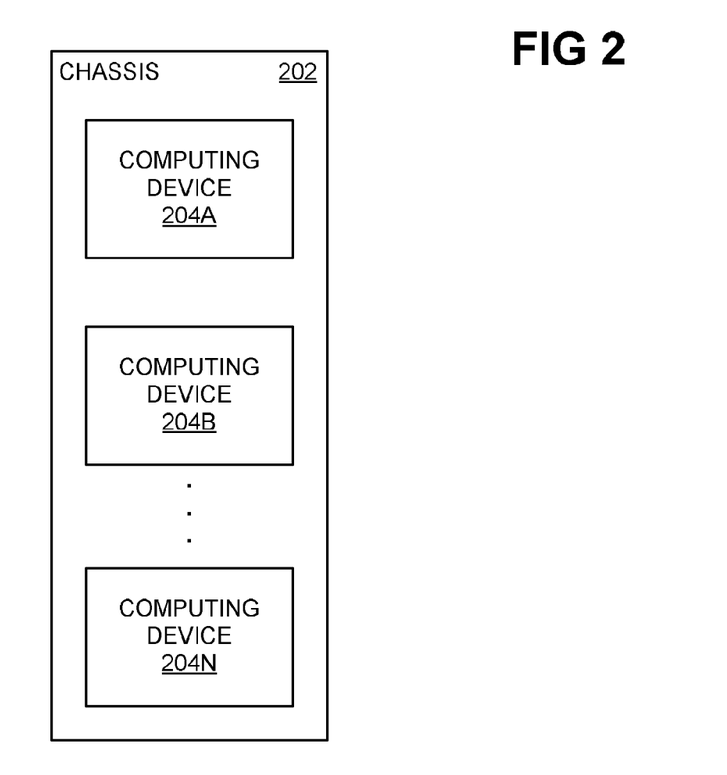
FIG. 2 is a diagram of a system, in accordance with which embodiments of the invention may be implemented.

FIG. 2 shows a rudimentary computing system 200, in accordance with which embodiments of the invention may be implemented. The system 200 includes a number of computing devices 204A, 204B, . . . , 204N, collectively referred to as the computing devices 204. The computing devices 204 are part of a common chassis 202, or case.

In one embodiment, the computing system 200 may be implemented in accordance with a blade paradigm. The computing devices 204 in this embodiment are blade computing devices that are inserted into the shared or common chassis 202. Each computing device 204 may then be assigned to an individual end user remotely located from the blade computing device 204, or a number of users may have their own virtualized computing devices shared on the same one or more blade computing devices 204.

Due to their size, blade computing devices may have no internal storage devices or a very limited number or size of internal storage devices, such as hard disk drives. Rather, they may be commonly assigned at least a portion of a storage device that is communicatively connected to all the blade computing devices, which is not depicted in FIG. 2. For example, one relatively common approach is to have a storage-area network (SAN) that includes a number of SAN storage devices. A logical disk may be defined on one or more of these SAN storage devices for utilization by a given blade computing device 204. For example, such a logical disk may store the operating system (OS) instance that controls the blade computing device 204 in question.

Figure 3:
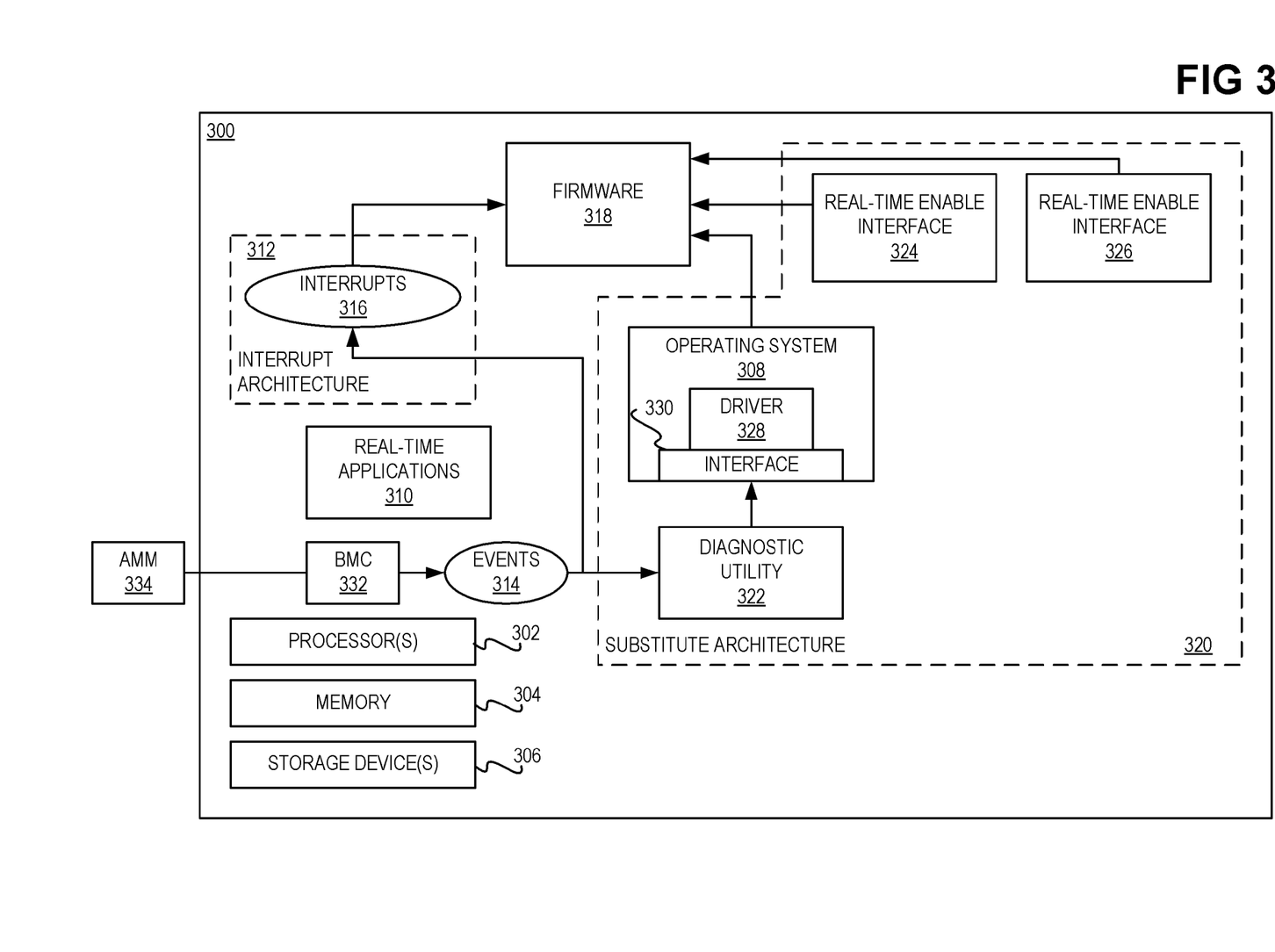
FIG. 3 is a diagram of a computing device, according to an embodiment of the invention.

FIG. 3 shows a computing device 300, according to one embodiment. The computing device 300 may exemplarily represent each of the computing devices 204 in one embodiment. The computing device 300 may itself also be referred to as a computing system. The computing device 300 may include hardware such as one or more processors 302, memory 304, and in one embodiment one or more storage devices 306, such as hard disk drives. Those of ordinary skill within the art can appreciate that the computing device 300 may include other hardware as well, such as network adapters, and so on.

The computing device 300 includes an instance of an operating system (OS) 308 that runs on the hardware of the computing device 300. One or more real-time applications 310 in turn run on the OS 308. The applications 310 are real-time applications in that they have to be able to respond to requests made of them such that one or more real-time constraints are satisfied. For example, as has been described above in relation to the method 100, they may have to be able to respond to such requests in less than a prespecified length of time. Because the real-time applications 310 are running on the OS 308 of the computing device 300, the computing device 300, and any computing system of which it is a part, is one that has real-time capabilities in this respect.

As is customary, the computing device 300 includes an interrupt architecture 312 by which events 314, such as thermal, power consumption, and error events, are detected to result in the generation of interrupts 316, such as non-maskable interrupts like system management interrupts (SMI's). The interrupts 316 are relayed to firmware 318, which may be a basic input/output system (BIOS). In response, the firmware 318 automatically processes the interrupts 316. As such, the firmware 318 interrupts any other processing by the processors 302. For instance, if the processors 302 are currently performing real-time operations for the real-time applications 310, these operations may be delayed sufficiently to result in the applications 310 not being able to satisfy the real-time criteria.

Therefore, the computing device 300 includes a substitute architecture 320 that can replace, or operate in lieu of, the interrupt architecture 312. The substitute architecture 320 is the different or additional architecture that has been referred to in relation to the method 100 of FIG. 1. It is noted that the interrupt architecture 312 may be responsible for generating just interrupts that are normally handled by the firmware, such that the substitute architecture 320 replaces, or operates, in lieu of this particular interrupt architecture 312. As such, interrupts that are normally handled by the operating system, such as input/output (I/O) device and timer interrupts, are not disabled.

That is, these operating system-handled interrupts are not interrupts that are generated within the interrupt architecture 312. Rather, the interrupt architecture 312 that is replaced by the substitute architecture 320 may just be responsible for generating interrupts that are handled by the firmware of the computing system, and not interrupts that are handled by the operating system. The substitute architecture 320 can in one embodiment include a diagnostic utility 322, modifications made to the OS 308 (hence the inclusion of the OS 308 inside the substitute architecture 320 in FIG. 3), and/or one or more interfaces 324 and 326.

The architecture 320 is responsive to the events 314 without violating the real-time criteria under which the real-time applications 310 run. In this respect, then, the architecture 320 is fundamentally different than the interrupt architecture 312. That is, the interrupt architecture can violate the real-time criteria under which the real-time applications 310 run, and does employ interrupts.

The diagnostic utility 322 and/or the modifications made to the OS 308 are such that the events 314 are monitored. For instance, in FIG. 3 it is shown that the diagnostic utility 322 directly monitors the events 314, but in another embodiment, the OS 308, upon modifications made thereto, can directly monitor the events 314. The events 314 are monitored in a preemptible manner. This means that if the real-time applications 310 require processing time on the processors 302 to satisfy the real-time criteria, monitoring of the events 314 can be preempted, so that such monitoring does not prevent the applications 310 from satisfying the real-time criteria. This is contradistinction to generation of the interrupts 316 and handling thereof by the firmware 318, which preempt the processing of the applications 310 by the processors 302.

The events 314 may be monitored by periodically polling the baseboard management controller (BMC) 332, various sensors, busses, fans, blowers, power supplies and so on, as can be appreciated by those of ordinary skill within the art, that result in generation of the events 314. For example, temperature sensors within the computing device 300 may be monitored to determine whether the current operating temperature exceeds a preset temperature threshold, such that a thermal event is generated. As another example, power circuitry within the computing device 300 may be monitored to determine whether the current power consumption exceeds a preset power consumption threshold, such that a power consumption event is generated. As a third example, a bus within the computing device 300 may be monitored to determine whether a flag has been set and/or a counter has been incremented, either of which correspond to a single memory bit error having occurred, such that an error event is generated.

The diagnostic utility 322 may, again in a preemptible manner, format the events 314 detected and provide them to a driver 328 of the OS 308 via an appropriate interface 330 of the OS 308, such as an application programming interface (API), like the intelligent platform management interface (IPMI). In this way, the driver 328 collects the events 314. During the monitoring and collection process, as before, the real-time applications 310 can preempt this monitoring and collection process at any time to ensure that the applications 310 continue to satisfy the real-time criteria. As such, the monitoring and collection process may run at a lower priority than the applications 310 do. The driver 328 and the diagnostic utility 322 may themselves be types of computer programs, as can be appreciated by those of ordinary skill within the art.

The driver 328 formats the events 314 that have been collected so that the events 314 are in a format understandable by (i.e., expected by) the firmware 318. At the appropriate time, the driver 328 informs the firmware 318 that a given event has occurred, to cause the firmware 318 to take corrective actions, and/or to report that a given event has occurred. It is noted that the firmware 318 may in one embodiment be considered part of the substitute architecture 320 itself, insofar as the firmware 318 may be modified to take appropriate corrective actions. Exemplary corrective actions that can be taken are described later in the detailed description.

That the driver 328 informs the firmware 318 that a given event has occurred at the appropriate time means that the driver 328 ensures that the firmware 318 is informed such that it has sufficient time to perform the corrective actions without affecting the ability of the real-time applications 310 to satisfy the real-time criteria. For example, the processors 302 may be running at a relatively high utilization rate. Therefore, the driver 328 may wait to inform the firmware 318 of a given event until the utilization rate of the processors 302 decreases, so that any corrective actions taken by the firmware 318 do not affect the ability of the applications 310 from satisfying the real-time criteria.

It is noted that the substitute architecture 320 operates in a bottom-up manner, in contradistinction with the interrupt architecture 312, which operates in a top-down manner. That is, in the substitute architecture 320, the events 314 are monitored by a relatively low-level diagnostic utility 322, for example, and then are transmitted to a higher-level driver 328 of the OS 308, and finally to the top-level firmware 318. By comparison, the interrupt architecture 312, upon generation of an interrupt 316 corresponding to an event 314, immediately proceeds to the firmware 318, which then may ask the OS 308 and other lower-level components to perform functionality.

The computing device 300 in one embodiment may include the BMC 332, or another type of service processor or secondary processor. The BMC 332 can detect when the computing device 300 has stopped responding, due to, for instance, the OS 308 and/or the applications 310 crashing or hanging. The BMC 332 may further be the component that specifically collects environmental information, such as temperature and power consumption information, which are the subject of the events 314. The BMC 332 can be the component that generates the interrupts 316 within the interrupt architecture 312 in one embodiment.

The BMC 332 may further interact with components but that are part of the computing system of which the device 300 is a part. These components may include an advanced management module (AMM) 334, for instance. In this way, the BMC 332 may receive from the AMM 334 the preset thermal threshold and the preset power consumption threshold that control whether certain events 314 are generated. In this way as well, the BMC 332 and/or the AMM 334 may be able to externally expose, outside of the computing device 300, the thermal information and the power consumption information, as well as other information, regarding the computing device 300, such as via the simple network management protocol (SNMP), as known within the art. That is, the BMC 332 may provide this information to the AMM 334.

The computing system 300 may be operable in both a real-time mode and a non-real-time mode. In the real-time mode, the interrupt architecture 312 is disabled, and the substitute architecture 320 is instead enabled. In the real-time mode, the real-time criteria have to be satisfied. In the non-real-time mode, the interrupt architecture 312 is enabled, and the substitute architecture 320 is disabled. In the non-real-time mode, the real-time criteria no longer have to be satisfied.

The OS 308 indicates to the firmware 318 that the computing device 300 is to operate in the real-time mode by communicating with the firmware 318 via a real-time enable interface 324, which may be an API. In response, the firmware 318 disables the interrupt architecture 312, and the OS 308 itself enables the substitute architecture 320. Similarly, the OS 308 indicates to the firmware 318 that the computing device 300 is to operate in the non-real-time mode by communicating with the firmware 318 via a real-time disable interface 326, which may also be an API. In response, the firmware 318 enables the interrupt architecture 312, and the OS 308 itself disables the substitute architecture 320. In one embodiment, if the OS 308 does not indicate to the firmware 318 whether or not the computing device 300 is to operate in the real-time mode, the firmware 318 defaults to the non-real-time mode.

In one embodiment, the interfaces 324 and 326 may each be or include the IPMI, as known within the art. In this embodiment, the IPMI is specifically used to inform the firmware 318 and/or the BMC 332 to disable interrupts 316 relating to throttling the frequency at which the processors 302 operate for power consumption and/or thermal purposes. Furthermore, the interfaces 324 and 326 may be or include an SMI control register to inform the firmware 318 to disable interrupts 316 relating to single-bit memory errors. Instead, such single-bit memory errors may be provided via the interface 330 defined between the driver 328 of the OS 308 and the diagnostic utility 322.

It is noted that while the computing device 300 is operating in the real-time mode, the firmware 318 may nevertheless be able to detect that the computing device 300 no longer has to operate in the real-time mode. For example, if the real-time applications 310 have hung or crashed, then the computing device 300 no longer has to operate in the real-time mode. As such, the firmware 318 may require that the real-time applications 310 periodically reset a "watch dog" timer maintained by the firmware 318. If this timer is not periodically reset, then it counts down to zero. When the timer reaches zero, this can signify to the firmware 318 that the real-time applications 310 are no longer operating correct. This is because the real-time applications 310 did not reset the timer as they were supposed to, and the firmware 318 thus concludes that the applications 310 have hung or crashed. Therefore, the computing device 300 no longer has to operate in real-time mode.

In embodiments of the invention, therefore, the interrupts 316 are disabled, and instead the OS 308 and/or the diagnostic utility 322 feed diagnostic information, such as the events 314, back to the firmware 318, instead of such events 314 being transmitted to the firmware 318 via the interrupts 316. The operating system 308 and/or the diagnostic utility 322 can further be the instruments by which corrective actions are performed, in addition to and/or in lieu of the firmware 318. In one embodiment, once the firmware 318 has determined that such corrective actions are to be taken, an SNMP trap may be employed via the AMM 334 in one embodiment, as understood by those of ordinary skill within the art, to convey back to the OS 308 and/or the diagnostic utility 322 the corrective actions that should be taken by the OS 308 and/or the utility 322.

However, there may be situations where the OS 308 is itself no longer operating properly (e.g., as may be concluded when the "watch dog" timer described above is allowed to count down to zero), such that the diagnostic utility 322 also cannot operate properly due to it running on the OS 308. In such situations, SNMP traps may be used so that the BMC 332 and/or the AMM 334 announces the thermal, power, memory error, or other types of failures to the computing system of which the computing device 300 is a part. The computing system can then determine the appropriate corrective action that should be taken, and cause this corrective action to be performed via communication with the BMC 332. For instance, the BMC 332 may be in communication with the AMM 334 of the computing system that is not part of any of the computing devices of the system, and from which the BMC 332 can receive instructions as to the corrective actions that should be instituted. In one embodiment, the corrective action may be performed by the operating system, an application program, or another type of computer program.

Detailed Method

Figure 4:
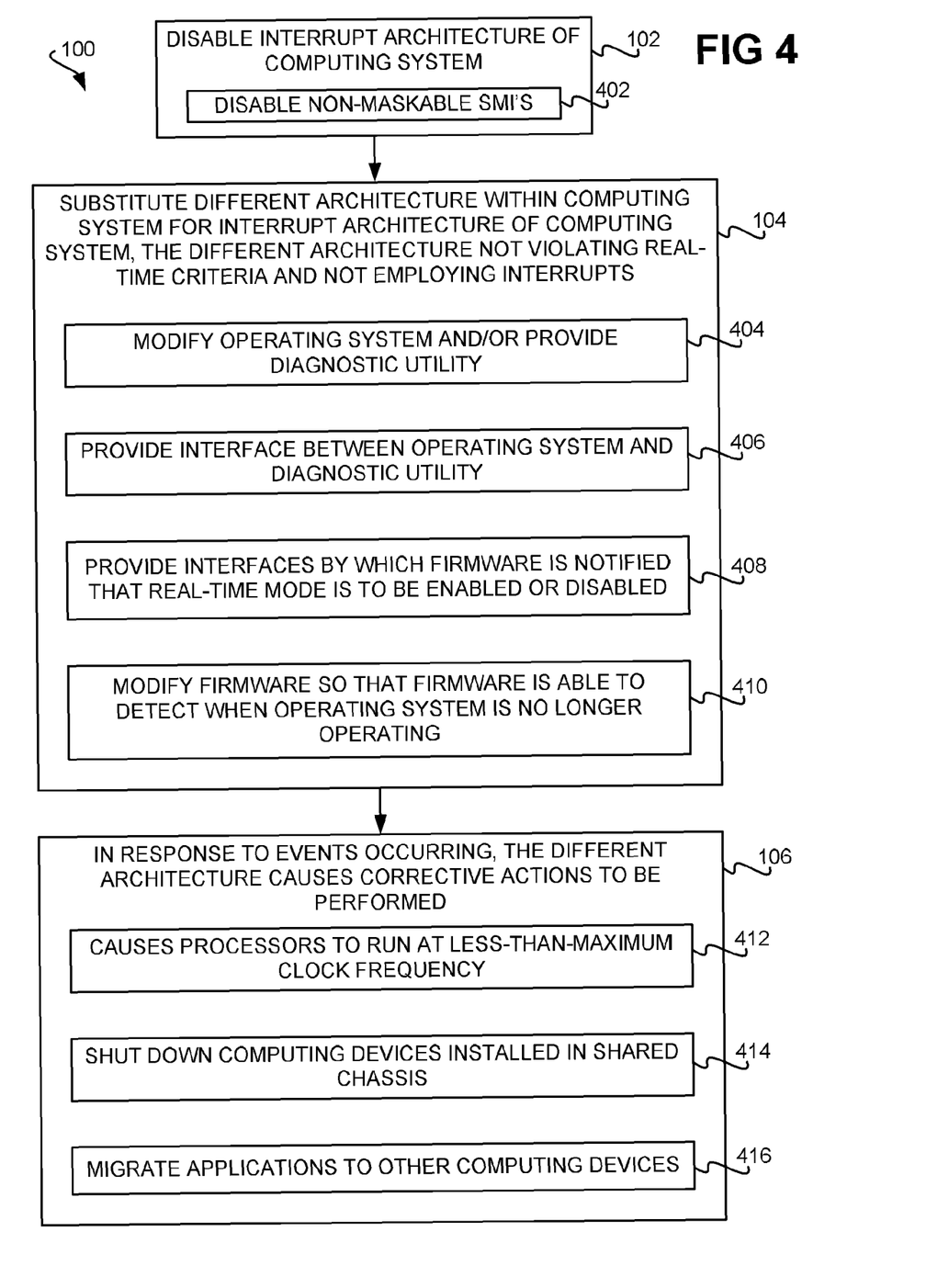
FIG. 4 is a flowchart of a method that is more detailed than but that is consistent with the method of FIG. 1, according to an embodiment of the invention.

FIG. 4 shows the method 100, according to an embodiment of the invention that is more detailed than but consistent with the embodiment of FIG. 1. The method 100 in relation to the embodiment of FIG. 4 is described with respect to the computing system 200 of FIG. 2 and the computing device 300 of FIG. 3 that have been described. As such, the computing device 300 can be considered as implementing each of the computing devices 204 of the computing system 200. It is noted that for descriptive and illustrative clarity, it is presumed in the method 100 of FIG. 4 that the computing system 200 and the computing device 300 are operating in real-time mode.

The interrupt architecture 312 of the computing device 300 is disabled (102). For instance, non-maskable system management interrupts (SMI's) may be disabled (402). Thereafter, the different architecture 320 is substituted within the computing system 300 for the interrupt architecture 312 (104), where the different architecture does not violate the real-time criteria in accordance with which the real-time applications 310 are to be run, and does not employ the interrupts 316, in contradistinction to the interrupt architecture 312. In one embodiment, part 104 can include performing part 404, part 406, part 408, and/or part 410.

Thus, the operating system (OS) 308 may be modified, and/or a diagnostic utility 322 can be provided, so that the events 314 are monitored in a preemptible manner such that the real-time criteria are not violated and such that the interrupts 316 are not generated (404), as has been described in relation to the computing system 300 of FIG. 3 in the previous section of the detailed description. The interface 330 between the driver 328 of the OS 308 and the diagnostic utility 322 may be provided so that the driver 328 collects and reduces the events 314 in a format understandable by the firmware 318 (406), as has also been described in the previous section of the detailed description.

The interfaces 324 and 326 may be provided by which the firmware 318 is notified that the real-time mode of the computing device 300 is to be enabled or disabled (410), as has been described in the previous section of the detailed description. The firmware 318 may be modified so that it is able to detect when the OS 308 is no longer operating properly (410). For instance, as has been described in the previous section of the detailed description, a watchdog timer may be provided that if it counts down to zero, it is presumed that the real-time applications 310 and/or the OS 308 have hung or crashed, such that the computing device 300 no longer has to operate in the real-time mode.

When the computing device 300 is operating in the real-time mode, the different architecture 320 causes corrective actions to be performed in response to the events 314 occurring (106). Examples of three such corrective actions are provided in parts 412, 414, and 416 of the method 100 in the embodiment of FIG. 1. First, one or more of the processors 302 of the computing device 300 may be run at less-than-maximum clock frequencies (412). Such throttling reduces power consumption of the computing device 300 as a whole, as well as the operating temperature of the device 300 as a whole. However, reducing the clock frequencies at which the processors 302 in question are run is achieved so that the real-time criteria under which the real-time applications 310 run are not violated. If this is not possible, then the clock frequencies are not reduced.

Second, the computing device 300, or another computing device within the chassis 202 of the computing system 200, may be shut down (414). Such shutdown reduces power consumption of the computing system 200 as a whole, and reduces the operating temperature of the computing system 200. For example, the computing device 300 may be operating at near-maximization utilization of its processors 302 to satisfy the real-time constraints under which the real-time applications 310 are running. The resulting additional heat and power consumption may cause the computing system 200 as a whole to generate too much heat or consume too much power. However, another computing device within the same chassis 202 of the computing system 200 may be idling. This other computing device may therefore be shut down so that the power consumption and the operating temperature of the computing system 200 as a whole are both below maximally allowed values. As such, the real-time criteria of the real-time applications 310 are still satisfied, because the computing device 300 on which the applications 310 are actually running is unaffected.

Third, one or more of the real-time applications 310 may be migrated from the computing device 300 to another computing device within the same chassis 302 (416), or indeed to a computing device within another chassis altogether. For example, the events 314 may indicate that the computing device 300 no longer has redundant power supply capabilities and/or redundant cooling capabilities (such as fans). As such, the real-time applications 310 may be migrated from the computing device 300 to another computing device so that performance of the real-time applications 310 is not affected if the computing device 300 later fails. It is noted that the migration is performed so that the real-time criteria governing execution of the real-time applications 310 are not violated. For instance, the real-time applications 310 may be duplicated on another computer device, and the instance of the applications 310 running on the computing device 300 removed after the applications 310 have been successfully duplicated on the other device.

As another example, the events 314 may indicate that the computing device 300 is under thermal stress and/or power consumption stress, such that the device 300 has an operating temperature greater than a temperature threshold and/or that it is consuming more power than a power consumption threshold. As such, the real-time applications 310 may be migrated from the computing device 300 to another computing device to rectify these problems. As before, the migration is performed so that the real-time criteria governing execution of the real-time applications 310 are not violated.

Advantages and Conclusion

Embodiments of the invention that have been described provide for advantages over the prior art. In particular, a computing system is provided with real-time capabilities in that real-time criteria governing execution of real-time applications are satisfied. Such real-time capabilities are provided for by disabling the interrupt architecture of the computing system, and replacing this architecture with a different architecture. The different architecture still provides for monitoring and responding to thermal, power consumption, and error events, as well as other types of events. However, the different architecture provides for a bottom-up process by which these events are monitored and responded to, which does not employ non-maskable interrupts so that processing of the real-time applications vis-à-vis the real-time criteria is unaffected. By comparison, employing an interrupt architecture, which provides for a top-down process by which the events are monitored and responded to, can affect the processing of the real-time applications vis-à-vis the real-time criteria, causing the criteria to be violated.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method for providing a computing system with real-time capabilities so that the computing system is capable of running applications such that one or more real-time criteria are satisfied, comprising:
    disabling an interrupt architecture of the computing system while still permitting other code of the computing system to run, the interrupt architecture generating interrupts sent to a firmware of the computing system in response to events;
    substituting a different architecture within the computing system for the interrupt architecture of the computing system, the different architecture responsive to the events, without violating the real-time criteria that govern the real-time capabilities, the real-time criteria comprising that the other code has to be executed such that the other code responds to other events within a time threshold; and,
    in response to the events occurring, the different architecture of the computing system causing one or more corrective actions to be performed without generating any interrupts,
    wherein the other code is code other than the interrupt architecture and the different architecture,
    wherein the other events are events other than the events in response to which the interrupt architecture generates the interrupts,
    wherein the other code does not process interrupts,
    and wherein the method provides for overcoming any potential for interrupts to affect an ability of the other code from satisfying the real-time criteria that otherwise exists.

2. The method of claim 1, wherein the events are selected as one or more of thermal events of the computing system, power consumption events of the computing system, and error events of the computing system.

3. The method of claim 2, wherein one or more of:
    the thermal events comprise an operating temperature of the computing system being greater than a threshold temperature;
    the power consumption events comprise a power consumption of the computing system being greater than a threshold power consumption; and,
    the error events comprise single-bit memory errors having been detected.

4. The method of claim 1, wherein the real-time criteria specify that the applications executed on the computing system are able to respond to requests in no more than a predetermined amount of time.

5. The method of claim 1, wherein disabling the interrupt architecture of the computing system comprises:
    disabling non-maskable interrupts that are sent to the firmware in response to the events occurring.

6. The method of claim 5, wherein disabling the non-maskable interrupts comprises:
    disabling system management interrupts (SMI's) that are sent to the firmware in response to the events occurring.

7. The method of claim 1, wherein substituting the different architecture for the interrupt architecture comprises modifying an operating system of the computing system so that the events are monitored in a preemptible manner such that the real-time criteria are not violated and such that interrupts are not employed.

8. The method of claim 1, wherein substituting the different architecture for the interrupt architecture comprises providing a diagnostic utility running on the computing system so that the events are monitored in a preemptible manner such that the real-time criteria are not violated and such that interrupts are not employed.

9. The method of claim 1, wherein substituting the different architecture for the interrupt architecture comprises:
    providing an interface between an operating system of the computing system and a diagnostic utility running on the computing system so that a driver of the operating system collects and translates the events to a format understandable by the firmware of the computing system.

10. The method of claim 1, wherein the different architecture of the computing system causing the corrective actions to be performed in response to the events occurring comprises one or more of:
    causing one or more processors of the computing system to be run at a less-than-maximum clock frequency that reduces power consumption of the computing system and that reduces operating temperature of the computing system without violating the real-time criteria; and,
    where the computing system comprises a plurality of computing devices installed in a shared chassis, shutting down one or more of the computing devices to reduce power consumption of the computing system and to reduce operating temperature of the computing system without violating the real-time criteria.

11. The method of claim 1, wherein the different architecture of the computing system causing the corrective actions to be performed in response to the events occurring comprises, where the computing system comprises a plurality of computing devices, one or more of:
    migrating one or more of the applications running on the computing system from one or more of the computing devices that no longer have at least one of redundant power supply capabilities and redundant cooling capabilities so that the real-time criteria will not be violated in relation to the applications; and,
    migrating one or more of the applications running on the computing system from one or more of the computing devices that are under at least one of thermal stress and power consumption stress so that the real-time criteria are not violated in relation to the applications.

12. The method of claim 1, further comprising:
    modifying the firmware so that the firmware is able to detect when the operating system is no longer operating in a real-time mode, to permit the firmware to conclude that the real-time capabilities of the computing system are no longer required.

13. The method of claim 1, further comprising:
    providing an interface by which an operating system of the computing system is able to notify the firmware that the computing system is to be operated in a real-time mode such that that the real-time criteria are to be satisfied; and,
    providing an interface by which an operating system of the computing system is able to notify the firmware that the computing system is no longer to be operated in the real-time mode such that the real-time criteria no longer have to be satisfied, wherein the interrupt architecture of the computing system is disabled by the firmware in response to the operating system notifying the firmware that the computing system is to be operated in the real-time mode, and wherein the interrupt architecture of the computing system is enabled by the firmware in response to the operating system notifying the firmware that the computing system is no longer to be operated in the real-time mode.

14. A computing system comprising:

one or more applications to be run on the computing system in real-time such that one or more real-time criteria are satisfied, the real-time criteria comprising that the one or more applications have to be executed such that the one or more applications respond to other events within a time threshold;

firmware;

an interrupt architecture by which generated interrupts are sent to the firmware in response to events; and, an additional architecture responsive to the events without violating the real-time criteria and without generating any interrupts, wherein the interrupt architecture is disabled without disabling the one or more applications of the computing system to run and the additional architecture is enabled to run the applications on the computing system in real-time such that the real-time criteria are satisfied, wherein the other code is code other than the interrupt architecture and the different additional architecture, wherein the other events are events other than the events in response to which the interrupt architecture generates the interrupts, wherein the other code does not process interrupts, and wherein the computing system provides for overcoming any potential for interrupts to affect an ability of the other code from satisfying the real-time criteria that otherwise exists.

15. The computing system of claim 14, wherein the additional architecture comprises one or more of:

a diagnostic utility; and, modifications to an operating system of the computing system, such that one or more of the diagnostic utility and the operating system monitor the events in a preemptible manner such that the real-time criteria are not violated and such that interrupts are not employed.

16. The computing system of claim 14, wherein the additional architecture comprises:

a first interface by which an operating system of the computing system is able to notify the firmware that the computing system is to be operated in a real-time mode such that the real-time criteria are to be satisfied; and, a second interface by which an operating system of the computing system is able to notify the firmware that the computing system is no longer to be operated in the real-time mode such that the real-time criteria no longer have to be satisfied.

17. The computing system of claim 14, wherein the additional architecture interacts with a management module to cause one or more corrective actions to be performed in response to the events occurring.

18. The computing system of claim 17, wherein the corrective actions comprise one or more of:

causing one or more processors of the computing system to be run at a less-than-maximum clock frequency that reduces power consumption of the computing system and that reduces operating temperature of the computing system without violating the real-time criteria;

where the computing system comprises a plurality of computing devices installed in a shared chassis, shutting down one or more of the computing devices to reduce power consumption of the computing system and to reduce operating temperature of the computing system without violating the real-time criteria;

where the computing system comprises the plurality of computing devices, migrating one or more of the applications from one or more of the computing devices that no longer have at least one of redundant power supply capabilities and redundant cooling capabilities so that the real-time criteria will not be violated in relation to the applications; and, where the computing system comprises the plurality of computing devices, migrating one or more of the applications from one or more of the computing devices that are under at least one of thermal stress and power consumption stress so that the real-time criteria are not violated in relation to the applications.

19. An article of manufacture comprising:

a recordable data storage medium; and, means in the medium for providing a computing system with real-time capabilities so that the computing system is capable of running applications such that one or more real-time criteria are satisfied, the real-time criteria comprising that other code has to be executed such that the other code responds to other events within a time threshold, by:

disabling an interrupt architecture of the computing system while still permitting the other code to run, the interrupt architecture generating interrupts sent to a firmware of the computing system in response to events; and, substituting a different architecture within the computing system for the interrupt architecture of the computing system, the different architecture responsive to the events without generating any interrupts, wherein the other code is code other than the interrupt architecture and the different architecture, wherein the other events are events other than the events in response to which the interrupt architecture generates the interrupts, wherein the other code does not process interrupts, and wherein the article provides for overcoming any potential for interrupts to affect an ability of the other code from satisfying the real-time criteria that otherwise exists.

20. The article of manufacture of claim 19, wherein substituting the different architecture for the interrupt architecture comprises one or more of:

performing at least one of modifying an operating system of the computing system and providing a diagnostic utility running on the computing system so that the events are monitored in a preemptible manner such that the real-time criteria are not violated and such that interrupts are not employed; and, providing an interface between the operating system and the diagnostic utility running on the computing system so that a driver of the operating system collects and translates the events to a format understandable by the firmware of the computing system.

* * * * *